United States Patent
Meng et al.

(10) Patent No.: US 8,977,720 B2
(45) Date of Patent: Mar. 10, 2015

(54) INTERNET BASED HOSTED SYSTEM AND COMPUTER READABLE MEDIUM FOR MODELING ANALYSIS

(76) Inventors: Zhaobing Meng, Ellicott City, MD (US); Zusheng Jin, Allen, TX (US); Yumin Chen, Plano, TX (US); Ping Ning, Oak Hill, VA (US)

( * ) Notice: Subject to any disclaimer, the term of this patent is extended or adjusted under 35 U.S.C. 154(b) by 333 days.

(21) Appl. No.: 13/308,745

(22) Filed: Dec. 1, 2011

(65) Prior Publication Data

US 2012/0166156 A1    Jun. 28, 2012

Related U.S. Application Data

(60) Provisional application No. 61/419,817, filed on Dec. 4, 2010.

(51) Int. Cl.
*G06F 15/16*    (2006.01)
*G06F 17/18*    (2006.01)
*G06F 17/10*    (2006.01)

(52) U.S. Cl.
CPC ............... *G06F 17/18* (2013.01); *G06F 17/10* (2013.01)
USPC .......................................... 709/219; 709/203

(58) Field of Classification Search
USPC ............................................................ 703/2
See application file for complete search history.

(56) References Cited

U.S. PATENT DOCUMENTS

| | | | |
|---|---|---|---|
| 6,629,081 B1 | 9/2003 | Cornelius | |
| 6,728,674 B1 * | 4/2004 | Griniasty | 704/256 |
| 6,850,252 B1 | 2/2005 | Hoffberg | |
| 7,069,234 B1 | 6/2006 | Cornelius | |
| 7,167,844 B1 | 1/2007 | Leong | |
| 7,610,233 B1 | 10/2009 | Leong | |
| 7,729,940 B2 | 6/2010 | Harvey | |
| 7,813,822 B1 | 10/2010 | Hoffberg | |
| 7,974,714 B2 | 7/2011 | Hoffberg | |
| 8,000,993 B2 | 8/2011 | Harvey et al. | |
| 8,438,122 B1 * | 5/2013 | Mann et al. | 706/12 |
| 8,473,431 B1 * | 6/2013 | Mann et al. | 706/12 |
| 2009/0030864 A1 * | 1/2009 | Pednault et al. | 706/45 |
| 2010/0017358 A1 * | 1/2010 | Roth | 706/54 |
| 2010/0030713 A1 * | 2/2010 | Simpson et al. | 706/11 |
| 2010/0211456 A1 * | 8/2010 | Reed et al. | 705/14.43 |
| 2013/0144819 A1 * | 6/2013 | Lin et al. | 706/12 |

* cited by examiner

*Primary Examiner* — Joshua Joo

(57) ABSTRACT

A Internet based system and computer readable medium comprising code for determining multiple modeling analysis tasks associated with a received data set, wherein the received data set is received via Internet, receiving a specification of multiple modeling analysis tasks, collecting a specification of the modeling analysis tasks via Internet, conducting a modeling analysis the received data set based on the determined multiple modeling analysis tasks and the received specification of the modeling analysis tasks and delivering a result of the modeling analysis via Internet.

3 Claims, 23 Drawing Sheets

INTERNET BASED HOSTED SYSTEM AND COMPUTER READABLE MEDIUM FOR MODELING ANALYSIS

BACKGROUND

The method and system are generally related to statistical modeling and more specifically to an Internet based hosted system and computer readable medium for modeling analysis.

Currently, modeling analysis requires modeling analysis software that has been purchased by the user. Additionally, current modeling analysis software requires an expert level of knowledge to be able to extract useful information from the analysis. These two items, expert level interaction and capital-intensive software create a significant barrier for companies with respect to modeling analysis.

Therefore, what is needed is an Internet based hosted system and computer readable medium for modeling analysis. More specifically, what is needed is an Internet based delivery of predictive modeling service for regression modeling on demand that provides simplified user interaction. The service can be delivered to an Internet browser, a mobile device, a data integration service such as messaging brokers or file transfer service.

Additionally, what is needed is a system and computer readable medium that allows remote access for predictive modeling from anywhere Internet access is available. A system that allows delivery of modeling services that can be provided through subscription services on the Internet, and delivery of modeling services that may be provided through a per model on demand pricing. A system and computer readable medium wherein one data set can be used to build multiple models on demand from the Internet and one model can be used to score multiple data sets on demand from the Internet.

It is envisioned that the system may share model data and results on demand by granting access as specified by the user. The system allows customization of modeling preferences, customization of modeling delivery methods and customization of modeling data and results sharing in user profile. The Internet based delivery of predictive modeling service for modeling for multiple customers maintains proper access control wherein one customer cannot view the data or result of another.

SUMMARY

An example of an Internet based computer program, which is embodied on a computer readable medium and operable to be executed by a processor, will be described. The computer program comprises computer readable program code for determining multiple modeling analysis tasks associated with a received data set, in which the received data set is received via Internet. The code has instructions for receiving a specification of multiple modeling analysis tasks, collecting a specification of the modeling analysis tasks via Internet, conducting a modeling analysis on the received data set based on the multiple modeling analysis tasks which were previously determined and the received specification, and delivering a result of the modeling analysis via Internet.

The program may additionally have code for collecting a target variable designation of the received data set, collecting a predictive modeling type designation of the modeling analysis tasks and collecting a data set format of the received data set. The predictive modeling of the received data set may be based on the multiple modeling analysis tasks that were determined, the data set format, the collected target variable designation and the predictive modeling type designation. The code may also comprise instructions for delivering the predictive model via Internet, scoring a fit of the predictive model and delivering the score of fit via Internet. The collected items may be collected via Internet.

The program may additionally comprise code for storing the received data set for application of multiple predictive models to the received data set. The code may comprise instructions for collecting via Internet at least one of a set of modeling preferences to be applied to the predictive model such as a delivery method preference, a data sharing preference and a results sharing preference.

Additionally it is envisioned that the program may comprise code for splitting the received data set into a training data set and a validation data set, training the predictive model to optimize a fit of the predictive model on the training data set and validating the predictive model utilizing the validation data set.

Additionally, the code may comprise instructions for storing the result records and result files of the predictive model, a received data set record, a target variable designation and a data set format.

The code may also comprise instructions for reading the following, the result records of the score of fit of the predictive model and the result files of the score of fit of the predictive model. After the program has completed the modeling analysis the code may have instructions for acknowledging completion of the modeling. The program may also comprise code for extracting header information from the received data set, wherein data set format comprises a statistical system file format. Common statistical system file format may include a CSV format, a SAS file format, a SPSS file format, a S-Plus file format, a Stata (DTA) file format, a Systat (SYS) file format, an EpiInfo (REC) file format, a Minitab (Minitab Portable Worksheet) file format, and an XML format or the like.

Weighting of a variable allows some variables more of an influence on results. The code may comprise instructions for collecting via Internet at least one of a weighted variable designation of the received data set, an included variable designation of the received data set, and an excluded variable designation of the received data set.

The code may have instructions for segmentation analysis such as determining a segmentation type of the received data set, where the segmentation type is chosen from a group consisting of supervised segmentation and unsupervised segmentation. Additionally, the code may contain instructions for collecting a target variable designation of the received data set, which may be collected via Internet, based on the supervised segmentation, determining multiple segmentation tasks, and performing at least one of a supervised segmentation analysis on the received data set based on multiple segmentation tasks, the target variable designation and the segmentation type. Unsupervised segmentation analysis of the received data set may be based on the determined multiple segmentation tasks and the segmentation type. In either case the code comprises instructions for delivering a result of the supervised segmentation analysis and the unsupervised segmentation analysis via Internet.

Additionally, the code may also comprise instructions for profiling analysis such as collecting via Internet a profiling population category variable designation of the received data set, determining multiple profiling tasks, conducting a profiling analysis of the received data set based on the determined multiple profiling tasks and the profiling population category variable designation, and delivering a result of the profiling analysis via Internet.

Further, the code may also comprise instructions for analysis of variance such as collecting an analysis of variance variable designation of the received data set via Internet, determining multiple analysis of variance tasks, conducting an analysis of variance test on the received data set based on the analysis of variance variable designation and multiple analysis of variance tasks, and delivering a result of the analysis of variance test via Internet.

In one example, a system comprises a memory operable to store a data set received via Internet and a model specification to be applied to the received data set. The system has one or more processors collectively operable to determine multiple statistical modeling tasks associated with the received data set, model the received data set based on the determined multiple statistical modeling tasks and the model specification, score a fit of the modeling of the received data set and deliver the scored model via Internet.

In the example system the memory may also store at least one of the models for application to multiple received data sets and the received data set for application of multiple models to the received data set. The memory may also store at least one of a set of modeling preferences to be applied to the model, a delivery method preference for delivery of the scored model, a data sharing preference of the received data set and a results sharing preference of the scored model.

In the example system the model may comprise multiple models that optimize multiple model fits of the received data set. The model specification may further comprise a received data set format of the received data set, a target variable designation of the received data set and at least one of a weighted variable designation of the received data set, an included variable designation of the received data set and an excluded variable designation of the received data set. The memory may be operable to store a received data set record of the received data set and the one or more processors may be operable to extract header information from the received data set. The processors may be operable to acknowledge completion of the modeling, receive a request for results of the scored modeling, receive result records of the scored modeling and receive result files of the scored modeling In another example a system may comprise a memory operable to store a data set received via Internet and a model specification to be applied to the received data set, the model specification comprises at least, a received data set format of the received data set, a target variable designation of the received data set and at least one of a weighted variable designation of the received data set. The system may also comprise an included variable designation of the received data set and an excluded variable designation of the received data set.

The system may further comprise one or more processors collectively operable to split the received data set into a training data set and a validation data set, train multiple models using multiple statistical modeling tasks to optimize multiple model fits of the training data set. The training is based on the model specification. The system validates multiple trained models utilizing the trained multiple model fits on the validation data set, score a fit of multiple validated models and deliver the scored multiple validated models via Internet.

The Internet communication interface may comprise at least one of an Internet browser, a mobile device, a data integration service and a file transfer service. The Internet communication network may comprise at least one of wired, wireless and optical communication.

DETAILED DESCRIPTION

Figure 1:
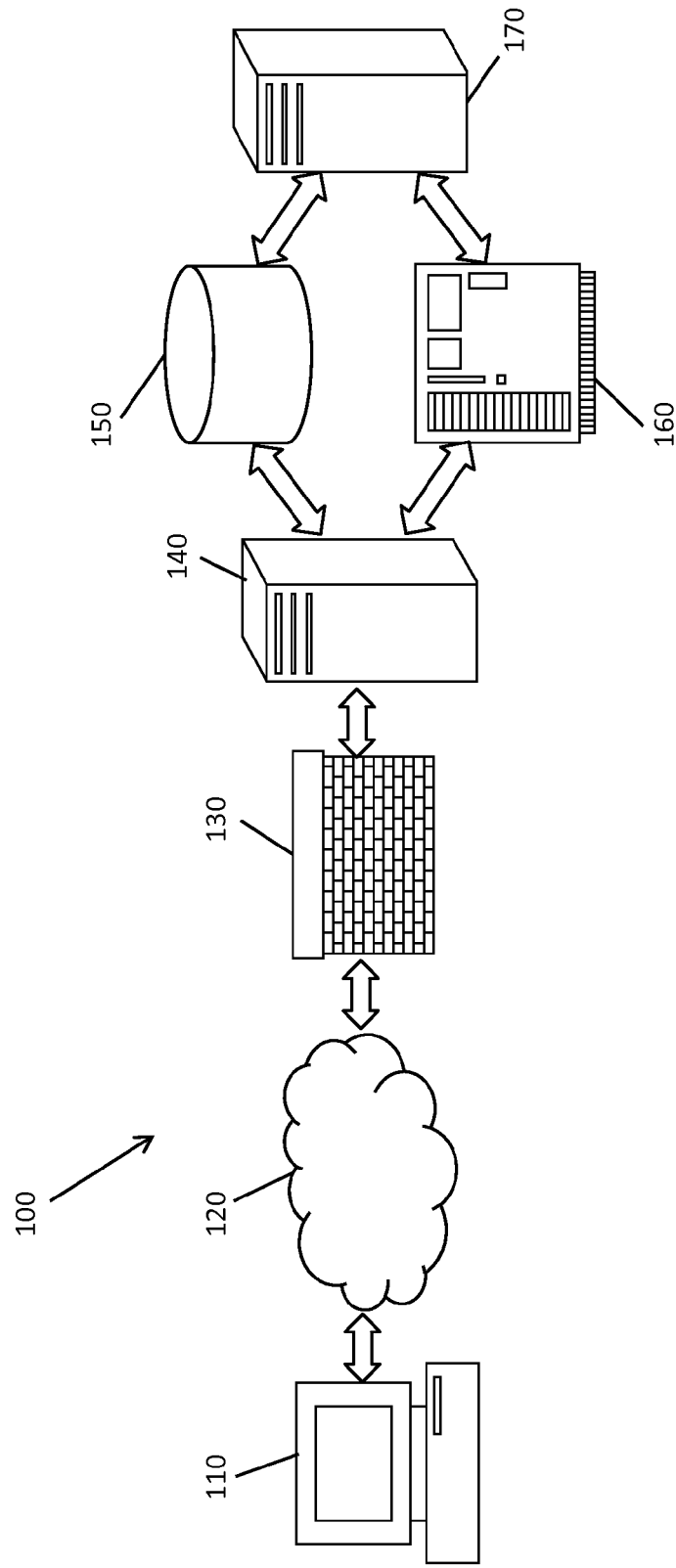
FIG. 1 depicts a first Internet based hosted system for modeling analysis.

FIG. 1 shows an example system diagram 100. A user accesses the system through an Internet browser on a computer 110. The service can be delivered to an Internet browser, a mobile device, a data integration service such as messaging brokers or file transfer service, or the like. The computer 110 is connected to via the Internet 120 to a firewall 130 of the system. The communication protocol may be Transmission Control Protocol (TCP), Internet Protocol (IP), Global System for Mobile Communications (GSM) or the like. The firewall 130 is networked to a web server 140, which in turn is networked to a database server 150 and a file system 160. The database server 150 and file system 160 are networked to an analytic modeling server 170. The communicative coupling can include wired, wireless, optical, a mixture of wired, wireless, optical or the like.

Figure 2:
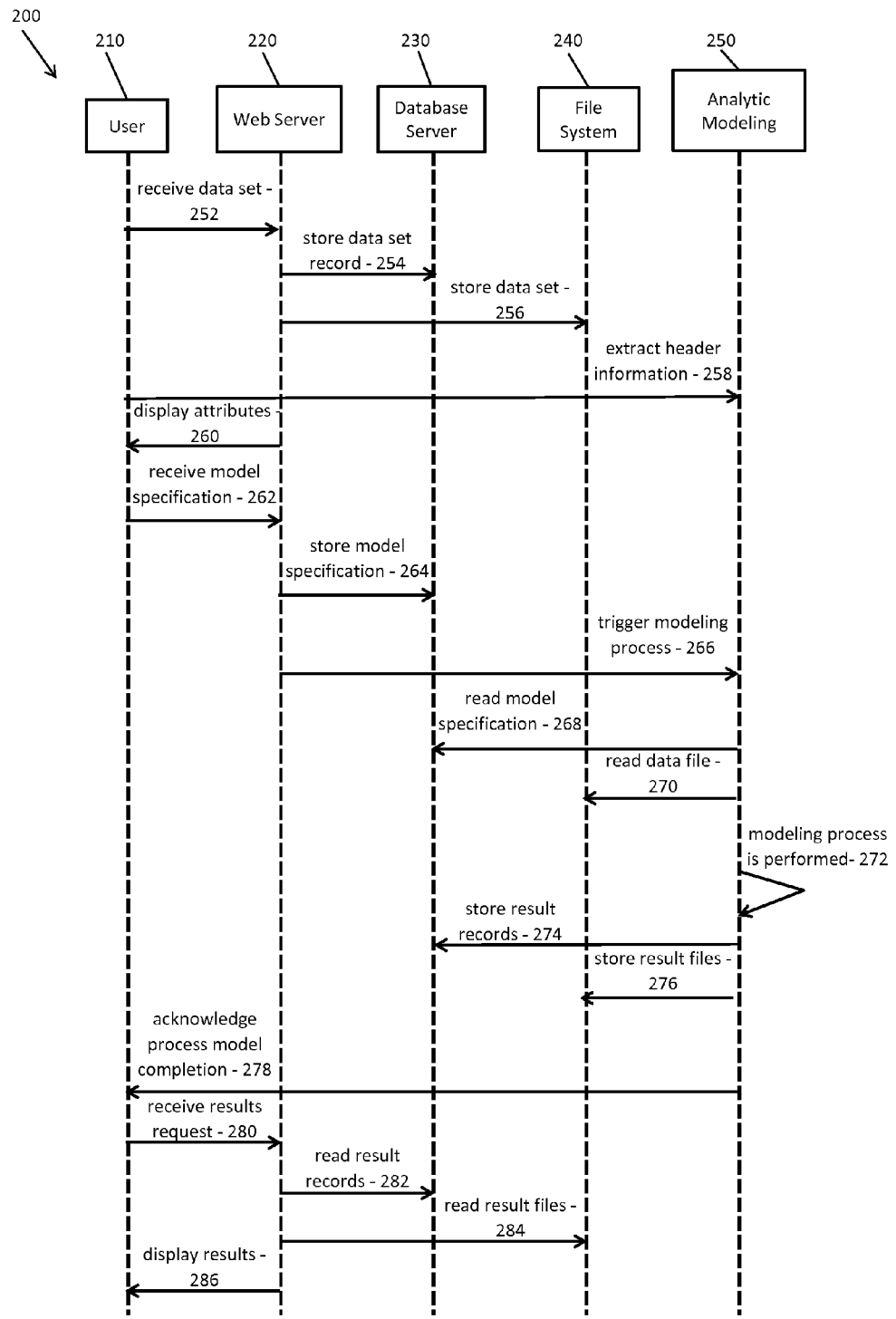
FIG. 2 depicts a flow diagram of the first Internet based hosted system for modeling analysis system.

An example operation 200 of the system is shown in FIG. 2. The operation 200 shows the interaction of a user 210, a web server 220, a database server 230, a file system 240 and an analytic modeling server 250. The web server 220 receives from the user 210 a data set 252 at the web server 220. The data set is compiled and supplied by the user, and can be sent for example as a spreadsheet or database file or the like. The web server 220 also receives from the user a model specification 262.

The model specification includes target variable, predictor attributes, modeling mode and the like. The data set has an associated record 254 which is stored on the database server 230. The data set is stored 256 on the file system 240, having been received from the web server 220. Header information is extracted 258 from the data set by the analytic modeling server 250.

The user 210 receives a display of the attributes 260 from the web server 220. The model specification is received from the web server 220 and is stored 264 on the database server 230. When the model specification is received from the web server 220 it triggers the modeling process 266.

The model specification is read 268 from the database server 230 by the analytic modeling server 250. The data file is read 270 from the file system 240 by the analytic modeling server 250. The modeling process is performed 272. The result records are stored 274 on the database server 230 from the analytic modeling server 250. The result files are stored 276 on the file system 240 from the analytic modeling sever 250.

After the modeling process an acknowledgement is received 278 by the user 210 from the analytic modeling server 250. The web server 220 receives a results request 280 from the user 210. The result records are read 282 by the web server 220 from the database server 230. The result files are read 284 by the web server 220 by the file system 240. The results are displayed 286 to the user 210 by the web server 220.

Figure 3:
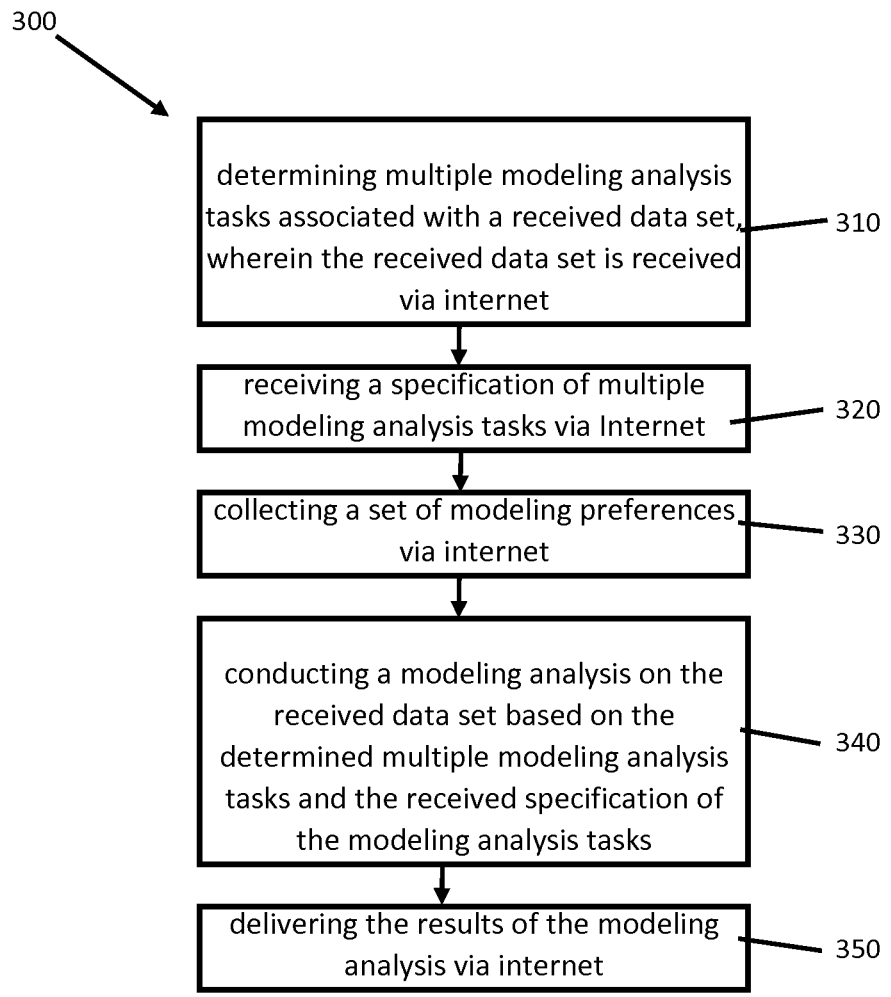
FIG. 3 depicts a software flow block.

An example of an Internet based computer program embodied on a computer readable medium for execution on a processor is shown in FIG. 3. The program comprises code for determining 310 multiple modeling analysis tasks associated with a data set received via Internet, receiving 320 a specification of multiple modeling analysis tasks and collecting 330 a set of modeling preferences via Internet. In addition the program comprises code for conducting 340 a modeling analysis on the received data set based on the determined multiple modeling analysis tasks and the received specification of the modeling analysis tasks and delivering 350 the result of the modeling analysis via Internet.

Figure 4:
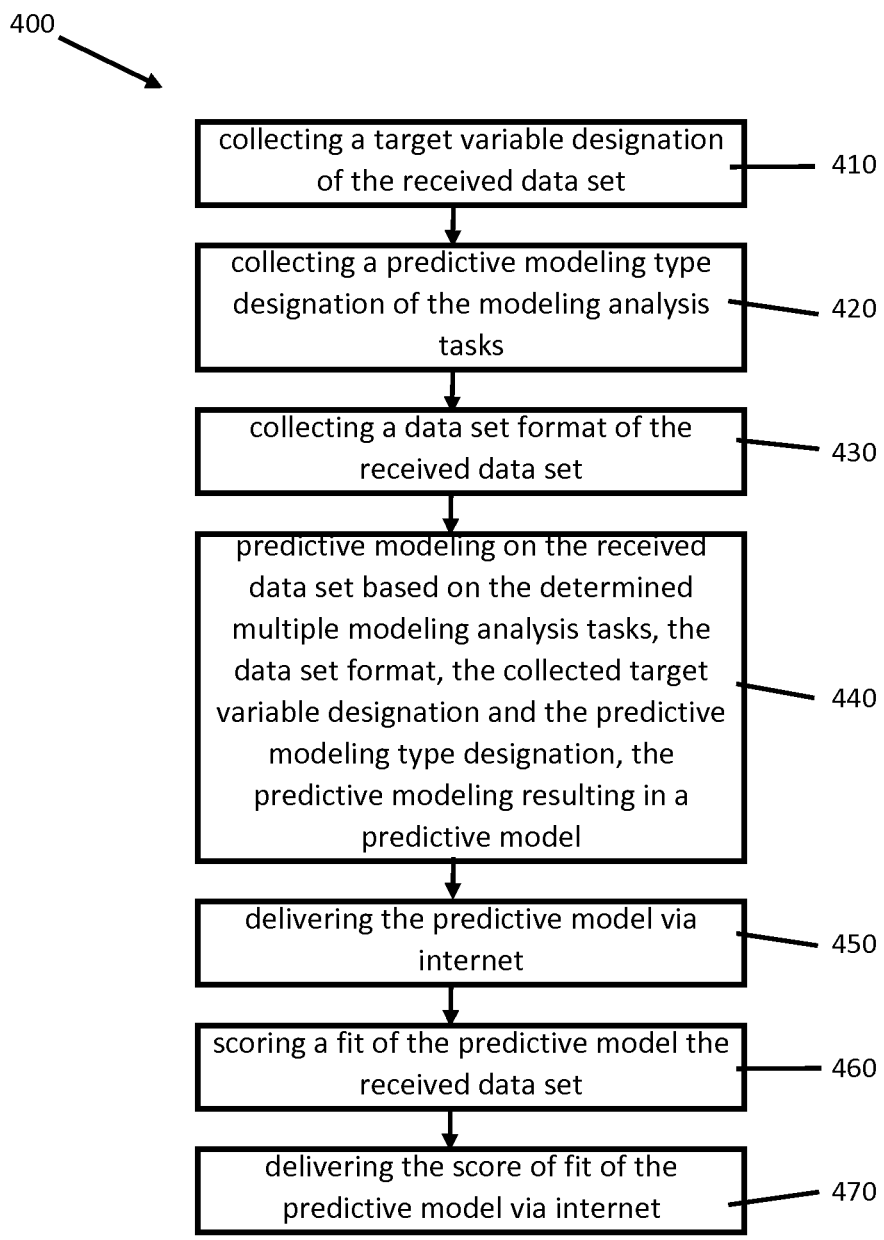
FIG. 4 depicts a predictive modeling portion of the software flow block.

The computer readable medium may also comprise instructions for collecting 410 a target variable designation of the received data set, collecting 420 a predictive modeling type designation of the modeling analysis tasks and collecting 430 a data set format of the received data set as shown in FIG. 4. The program can also comprise instructions for performing 440 predictive modeling of the received data set based on the determined multiple modeling analysis tasks, the data set format, the collected target variable designation and the predictive modeling type designation, resulting in a predictive model. The computer readable medium may also comprise instructions for delivering 450 the predictive model via Internet, scoring 460 a fit of the predictive model the received data set and delivering 470 the score of fit of the predictive model via Internet. The collected items may be collected via Internet.

Figure 5:
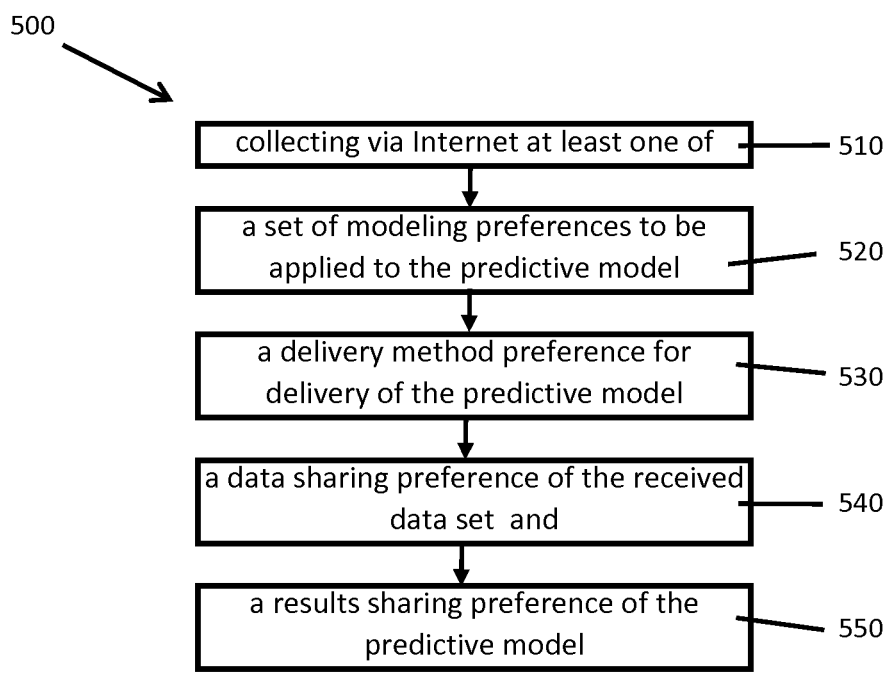
FIG. 5 depicts a user preference portion of the software flow block.

User preferences may also be collected as shown by 500 of FIG. 5. The user preference collection may include collecting via Internet 510 at least one of a set of modeling preferences 520, a delivery method preference 530 for delivery of the predictive model, a data sharing preference 540 of the received data set and a results sharing preference 550 of the predictive model that can be set by the user.

Figure 6:
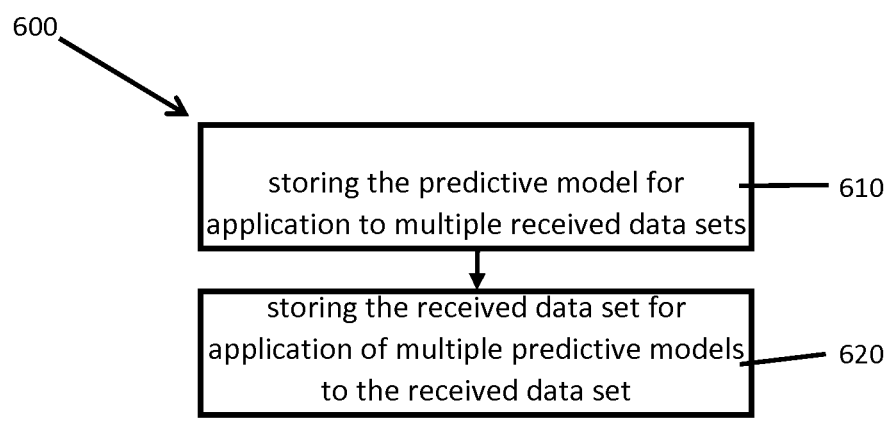
FIG. 6 depicts storage for future use portion of the software flow block.

Referring to FIG. 6, the code may include storing 610 the predictive model for application to multiple received data sets and storing 620 the received data set for application of multiple predictive models to the received data set.

Figure 7:
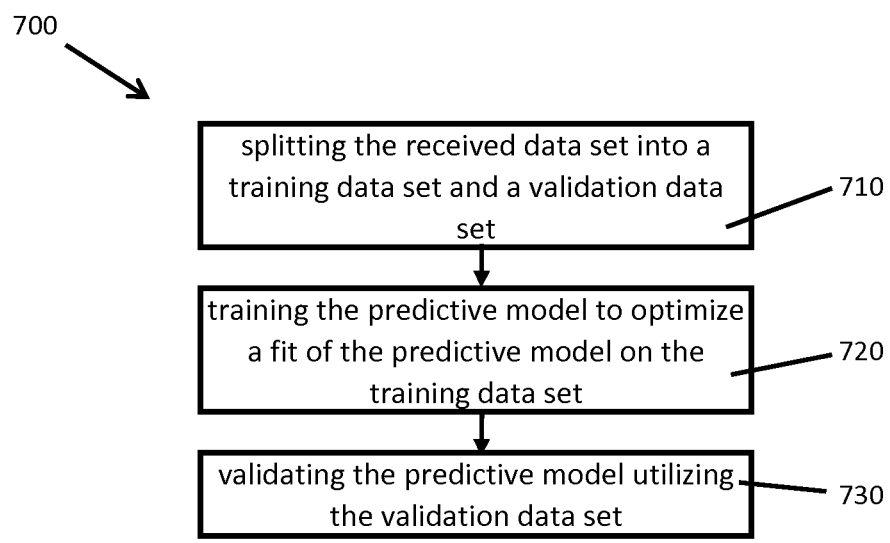
FIG. 7 depicts a training and validation portion of the software flow block.

A training set is a subset of the received data used to discover potentially predictive relationships. A validation set is a subset of the received data that is used to determine how well the predictive model fits. FIG. 7 depicts a training and validation portion of the software flow block comprising instructions for 700 splitting 710 the received data set into a training data set and a validation data set, training 720 the predictive model to optimize a fit of the predictive model on the training data set and validating 730 the predictive model utilizing the validation data set.

Figure 8:
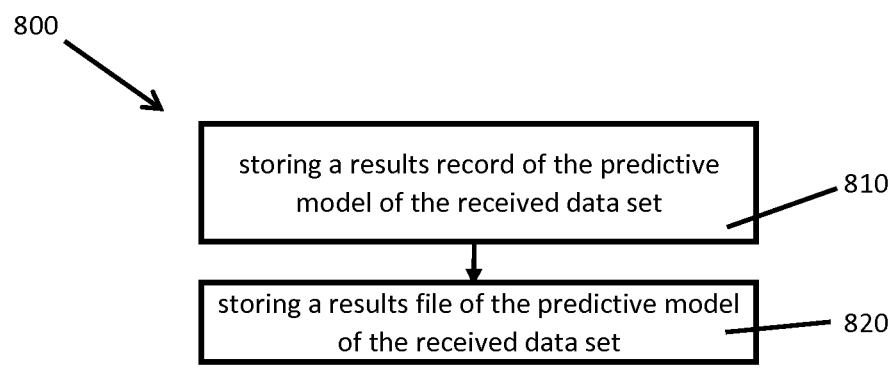
FIG. 8 depicts storage of the predictive model portion of the software flow block.

FIG. 8 depicts storage 800 of the predictive model portion of the code associated with the results of the predictive model. In this example the computer readable media may contain instructions for storing 810 the result records of the predictive model of the received data set and storing 820 the result files of the predictive model of the received data set.

Figure 9:
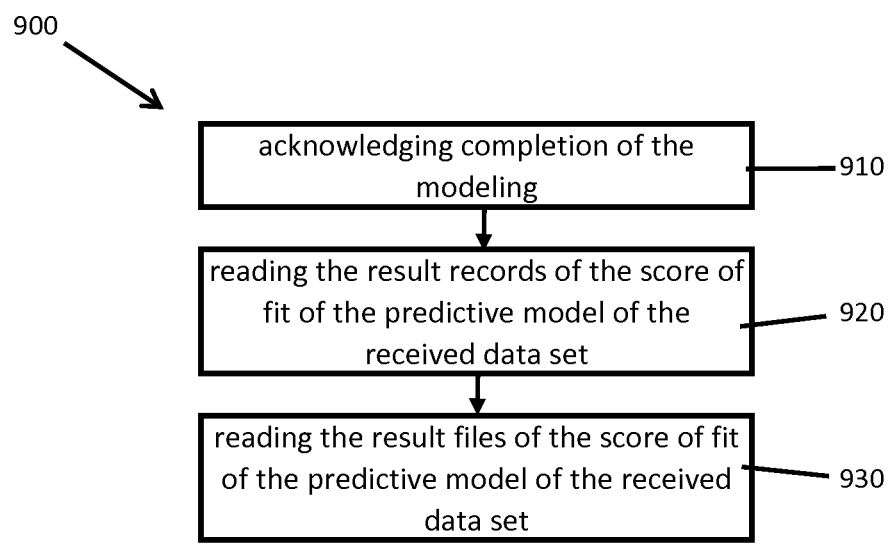
FIG. 9 depicts modeling completion and reading of data portion of the software flow block.

After the predictive modeling of the received data set has been completed the computer readable media may contain instructions for sending 910 an acknowledgement of the completion of modeling to the user, reading 920 the result records of the score of fit of the predictive model, and reading the scoring 930 the result files of the score of fit as shown in FIG. 9.

Figure 10:
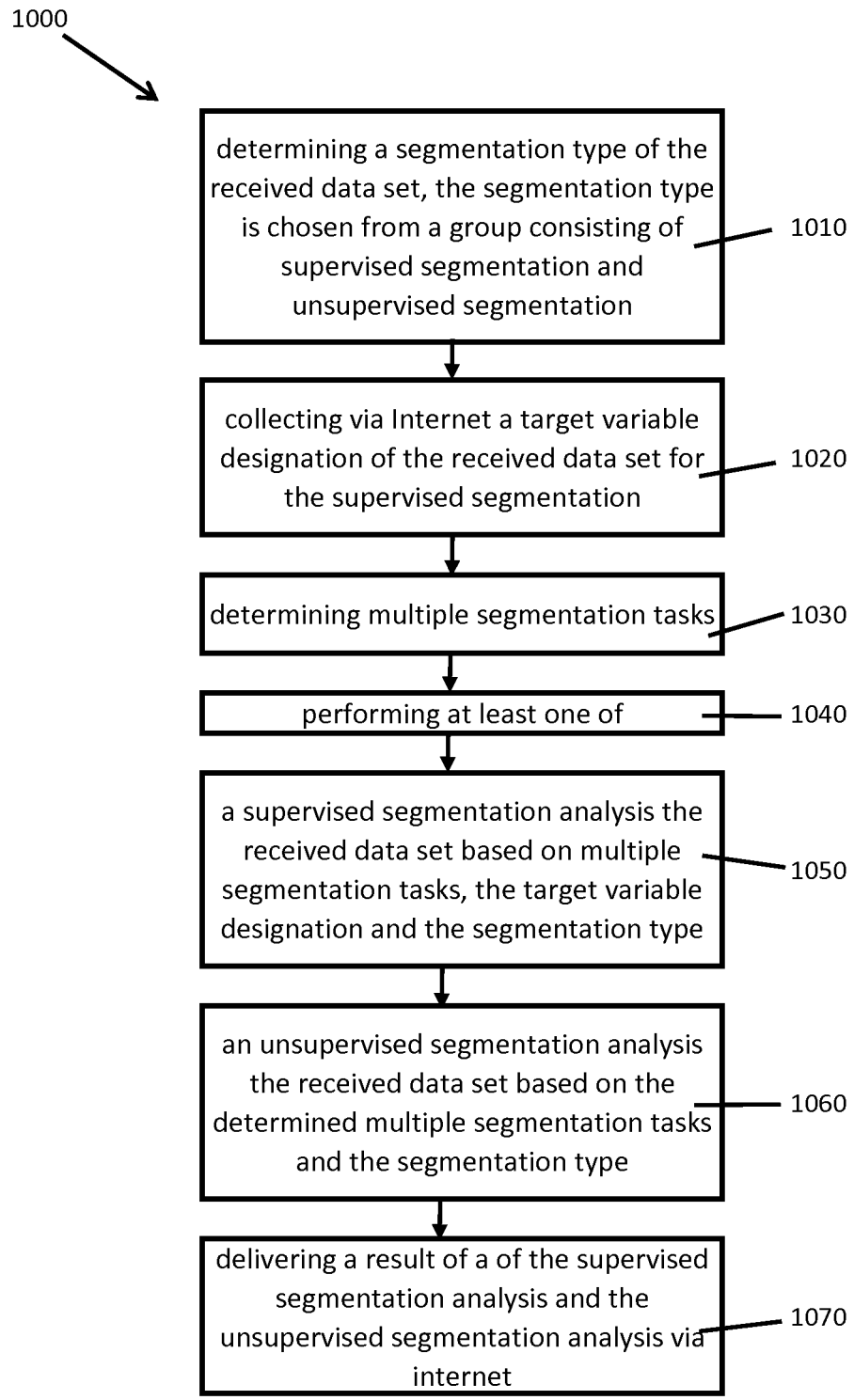
FIG. 10 depicts segmentation analysis portion of the software flow block.

Segmentation analysis is the task of assigning portions of the received data set into groups so that the objects in the same group are more similar to each other than to those in other groups. Segmentation of the received data set can also be performed 1000 as shown in FIG. 10. The segmentation type of the received data set is determined 1010. The segmentation type can be one of several types that include supervised segmentation and unsupervised segmentation. A target variable designation is collected via Internet 1020 for supervised segmentation. Multiple segmentation tasks are determined 1030 and either a supervised or an unsupervised segmentation analysis is performed 1040. If the supervised segmentation analysis 1050 is performed on the received data set, it is based on the multiple segmentation tasks, the target variable designation and the segmentation type. If an unsupervised segmentation analysis is performed 1060 on the received data set, it will be based on the determined multiple segmentation tasks and the segmentation type. Afterwards the results of the supervised segmentation analysis and/or the unsupervised segmentation analysis are delivered 1070 via Internet.

Figure 11:
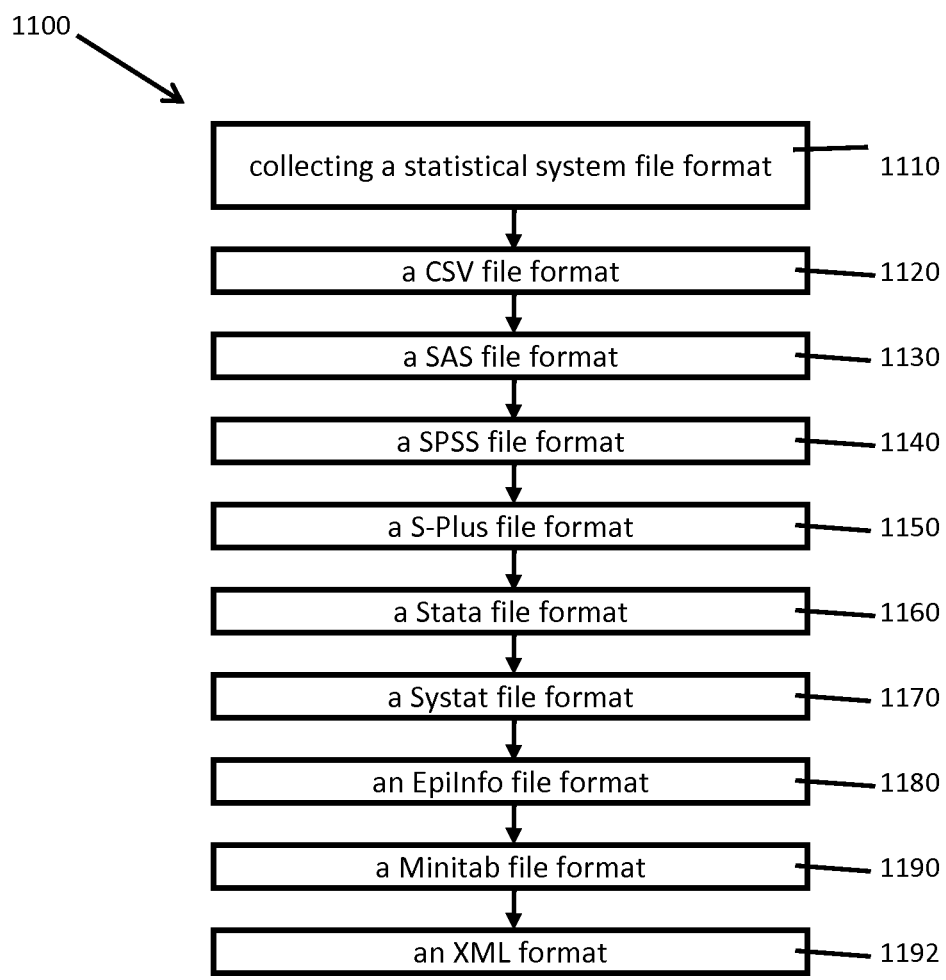
FIG. 11 depicts a data set selection portion of the software flow block.

The data set format for the user supplied data set can comprise 1100 a statistical system file format such as a CSV format 1110, a SAS file format 1120, a SPSS file format 1130, a S-Plus file format 1140, a Stata file format 1150, a Systat file format 1160, an EpiInfo file format 1170, a Minitab file format 1180, and an XML format 1190 or the like as shown in FIG. 11.

Figure 12:
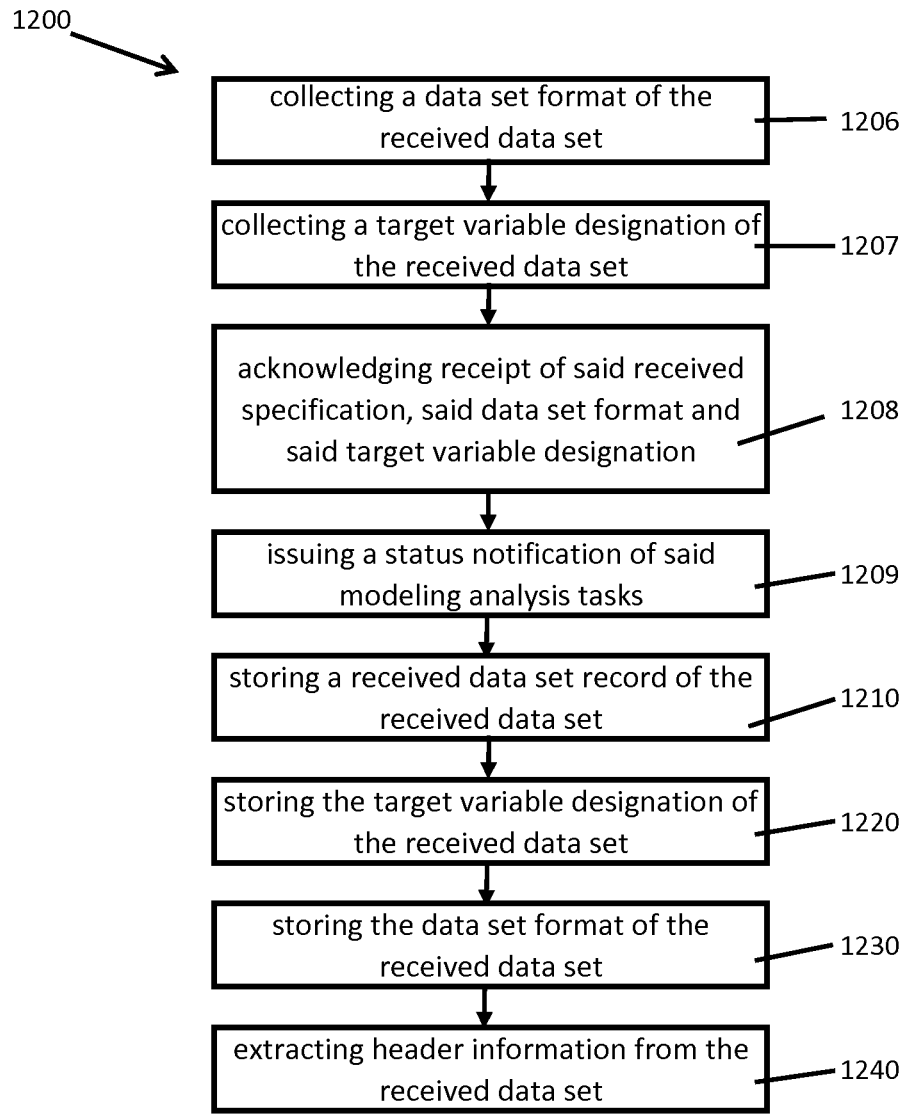
FIG. 12 depicts an information storage and header extraction portion of a software flow block.

Various types of information can be gleaned and stored from the received data set as shown in FIG. 12. The data set format 1206 and the target variable designation 1207 of the received data set are collected via Internet. The code may also acknowledge 1208 the user of received task instructions such as the receipt of the specification, data set format and target variable designation. A notification may also be sent 1209 to the user as to the status of modeling analysis tasks. The received data set record 1210, the target variable designation 1220 and the data set format 1230 of the received data set can be stored, and the header information can be extracted 1240.

Population profiling is an analysis of the received data to clarify the structure, content and relationships. Profiling analysis will allow user to have insights into multiple comparable population universes. Profiling analysis will compare and contrast attributes by designated populations on multiple selected dimensions.

Figure 13:
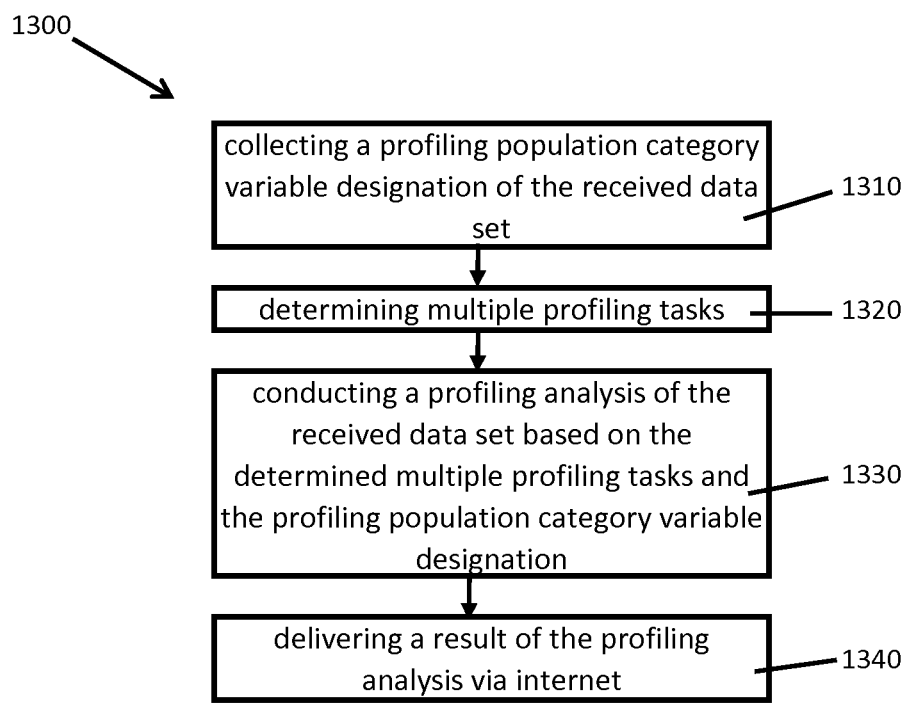
FIG. 13 depicts a profiling analysis portion of the software flow block.

The code may include profiling data of the received data set that can be analyzed as shown by 1300 in FIG. 13. One such analysis can include collecting via Internet 1310 a profiling population category variable designation of the received data set, determining 1320 multiple profiling tasks, conducting 1330 a profiling analysis of the received data set based on the determined multiple profiling tasks and the profiling population category variable designation, and delivering 1340 a result of the profiling analysis via Internet.

Figure 14:
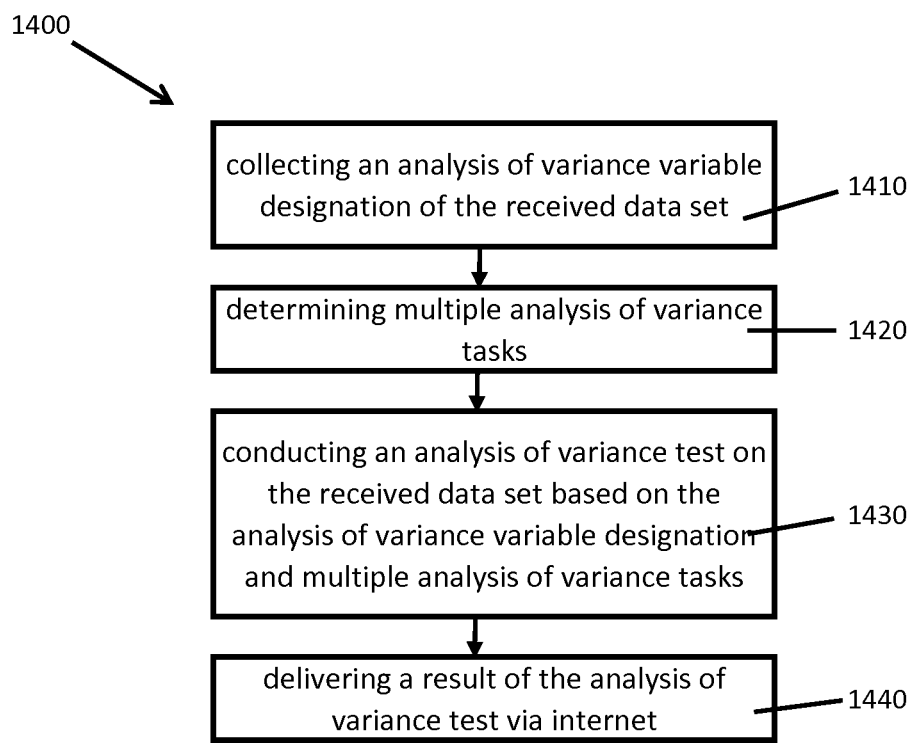
FIG. 14 depicts an analysis of variance (ANOVA) portion of the software flow block.

Analysis of variance is a statistical method for making simultaneous comparisons between two or more means. This statistical method yields values that can be tested to determine whether a significant relation exists between variables. Analysis of variance (ANOVA) information can also be ascertained 1400 from the received data set, an example of which is shown in FIG. 14. An analysis of variance variable designation of the received data set can be collected via Internet 1410, multiple tasks associated with the ANOVA test can be determined 1420 and then the actual conduction 1430 of an analysis of variance test can be performed based on the analysis of variance variable designation and multiple analysis of variance tasks. The results of the ANOVA test can be delivered 1440 by Internet.

Figure 15:
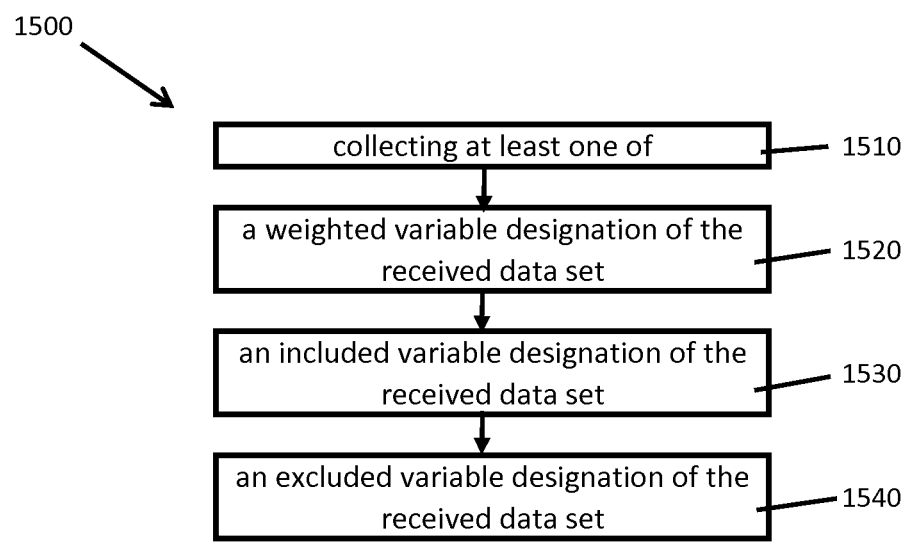
FIG. 15 depicts a variable designation portion of the software flow block.

Variable designations of various types of the received data set may also be collected via Internet 1510, as shown in FIG. 15. The types of variable designations may include a weighted variable 1520, an included variable 1530 and an excluded variable 1540.

Figure 16:
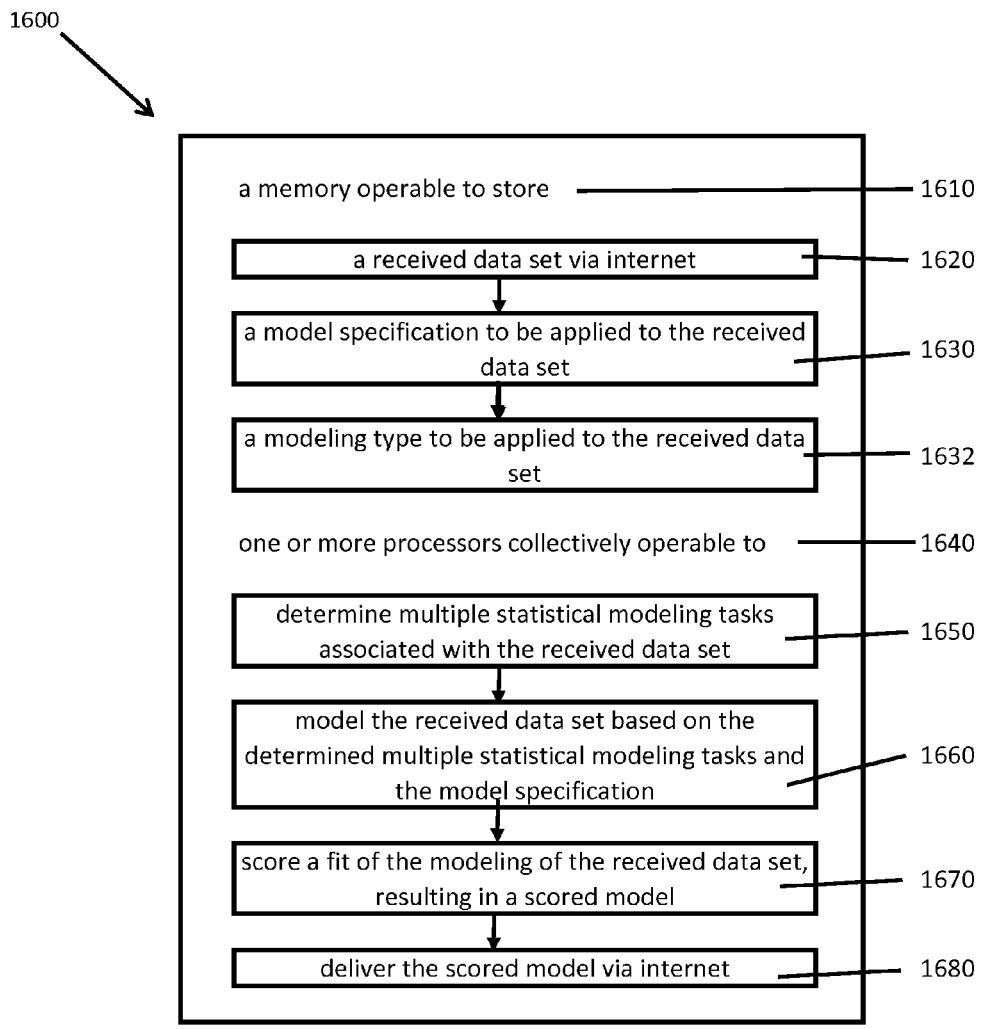
FIG. 16 depicts a second Internet based hosted system for modeling analysis.

A preferred system 1600 to implement the modeling analysis is shown in FIG. 16. The system would comprise a memory 1610 operable to store a received data set 1620 that had been received via Internet and a model specification 1630 to be applied to the received data set and modeling type 1632. The system would comprise one or more processors 1640 collectively operable to determine multiple statistical modeling tasks 1650 associated with the received data set, model the received data set 1660 based on the determined multiple statistical modeling tasks and the model specification and the model preference, score a fit of the modeling 1670 of the received data set, result in a scored model, and deliver 1680 the scored model via Internet.

Figure 17:
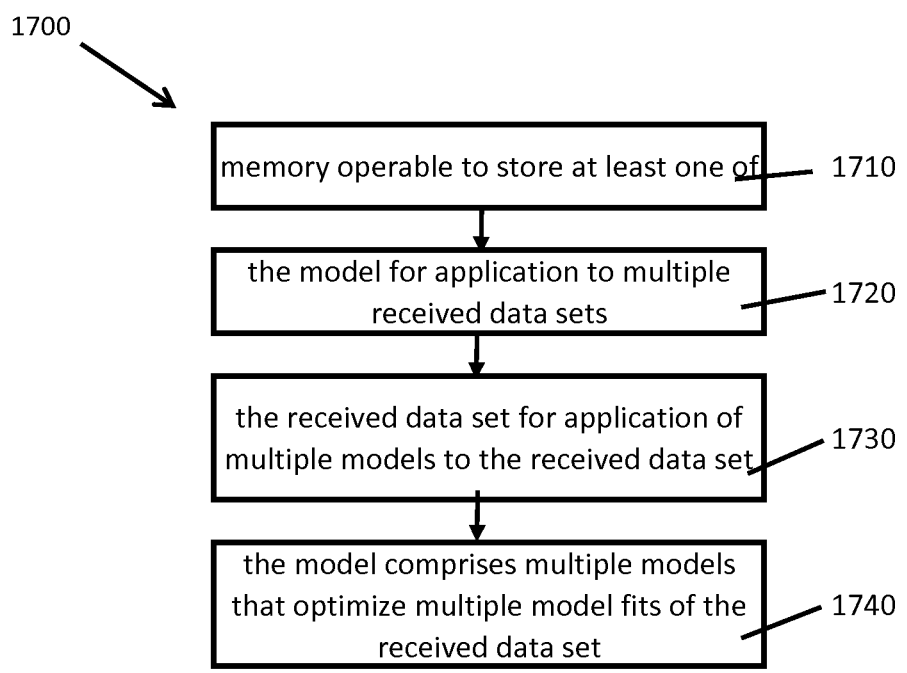
FIG. 17 depicts storage for future use portion of the system.

Regarding FIG. 17, the system may also comprise memory that is configured to store 1710 at least one of the model 1720 for application to multiple received data sets, the received data set 1730 for application of multiple models to the received data set. The model may comprise multiple models that optimize multiple model fits of the received data set 1740.

Figure 18:
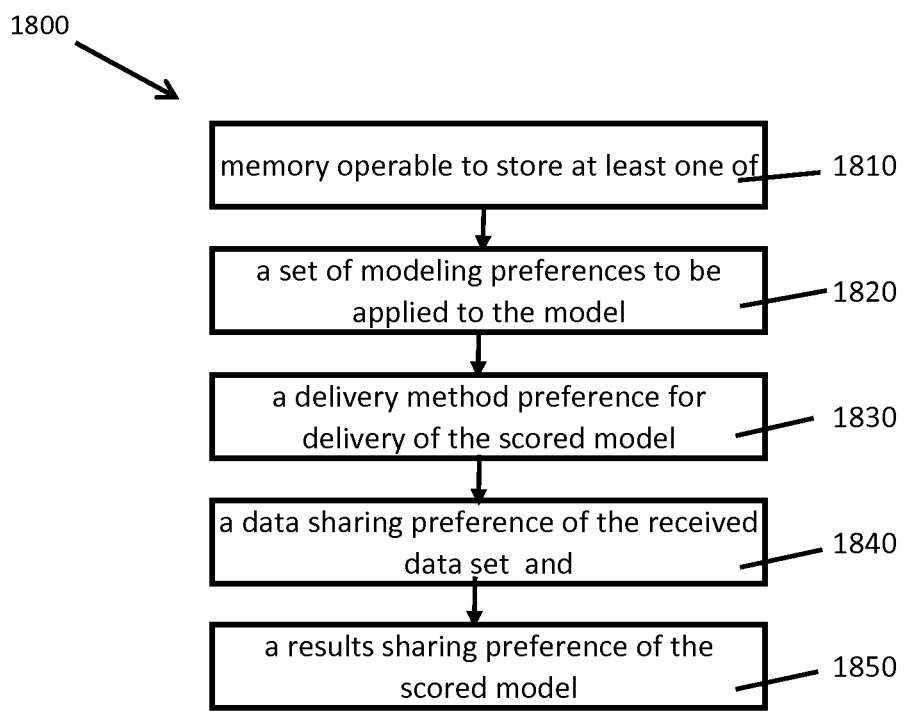
FIG. 18 depicts a user preference portion of the system.

As shown in FIG. 18, the system may additionally comprise memory that is configured to store 1810 at least one of a set of modeling preferences 1820 to be applied to the model, a delivery method preference 1830 for delivery of the scored model, a data sharing preference 1840 of the received data set and a results sharing preference 1850 of the scored model and the like.

Figure 19:
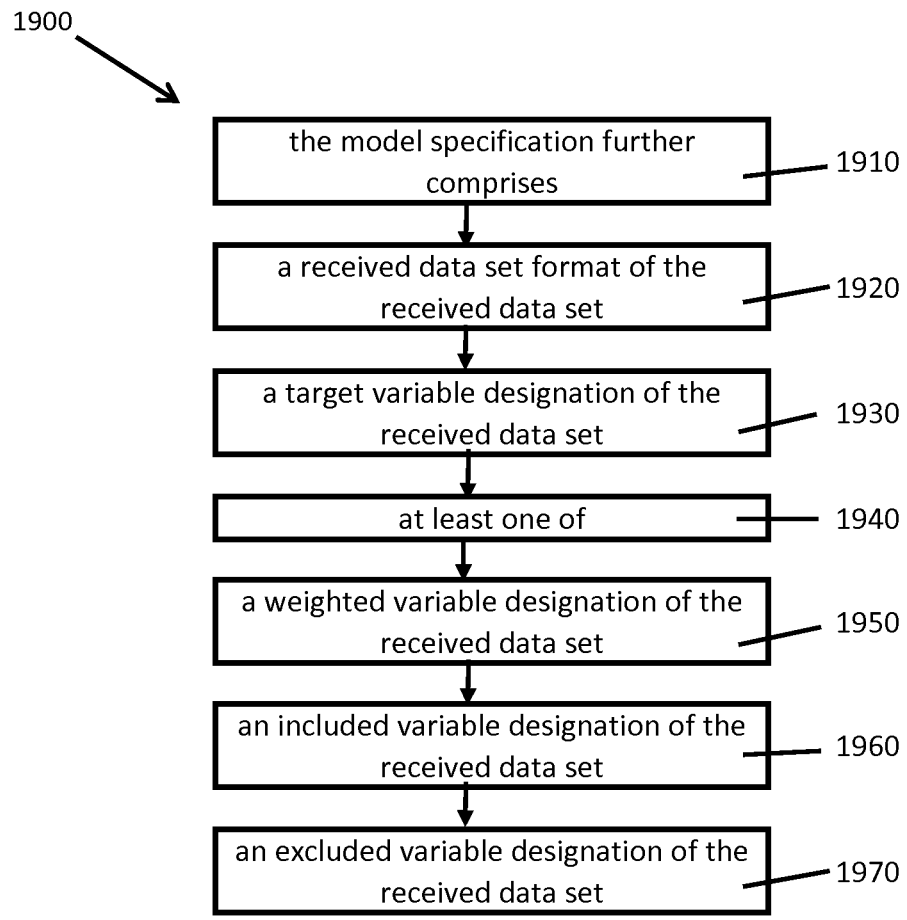
FIG. 19 depicts a model specification portion of the system.

Regarding FIG. 19, the model specification 1910 may further include a received data set format 1920, a target variable designation 1930 and at least one of 1940 a weighted variable designation 1950, an included variable designation 1960 and an excluded variable designation 1970.

Figure 20:
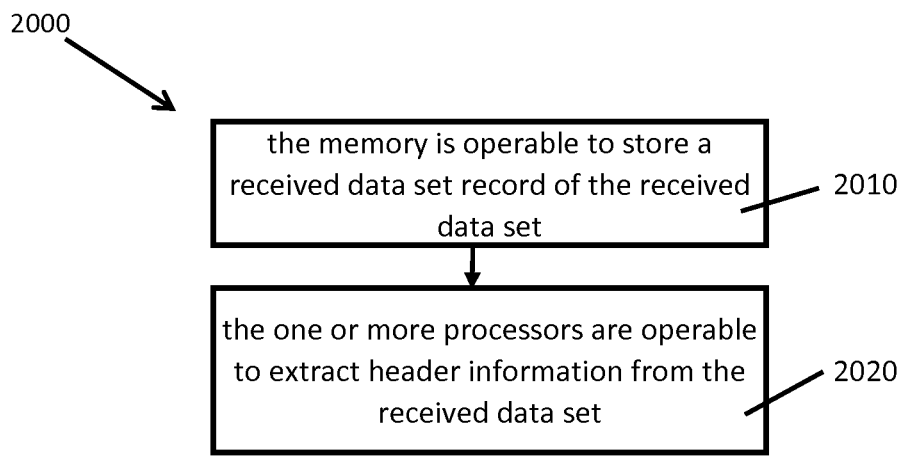
FIG. 20 depicts an information storage and header extraction portion of the system.
Figure 21:
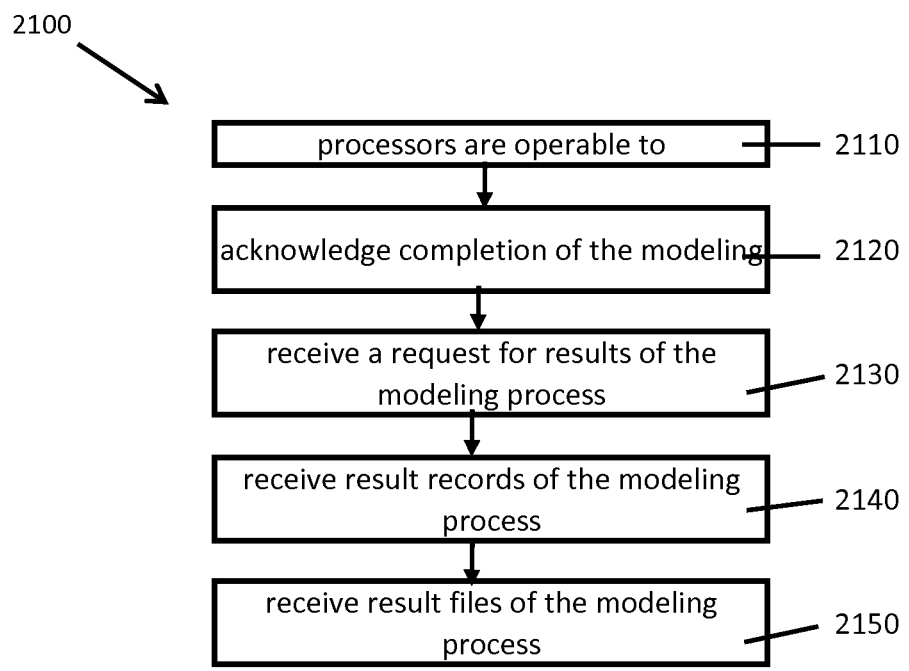
FIG. 21 depicts a modeling analysis completion and receiving of data portion of the system.

As shown in FIG. 20, the memory may further be operable to store a received data set record 2010 and the one or more processors may be operable to extract header information 2020 from the received data set.

The processors may be additionally operable 2110 to acknowledge completion 2120 of the modeling. With respect to the scored modeling, the system may be operable to receive a request for results 2130, receive result records 2140 and receive result files 2150.

Figure 22:
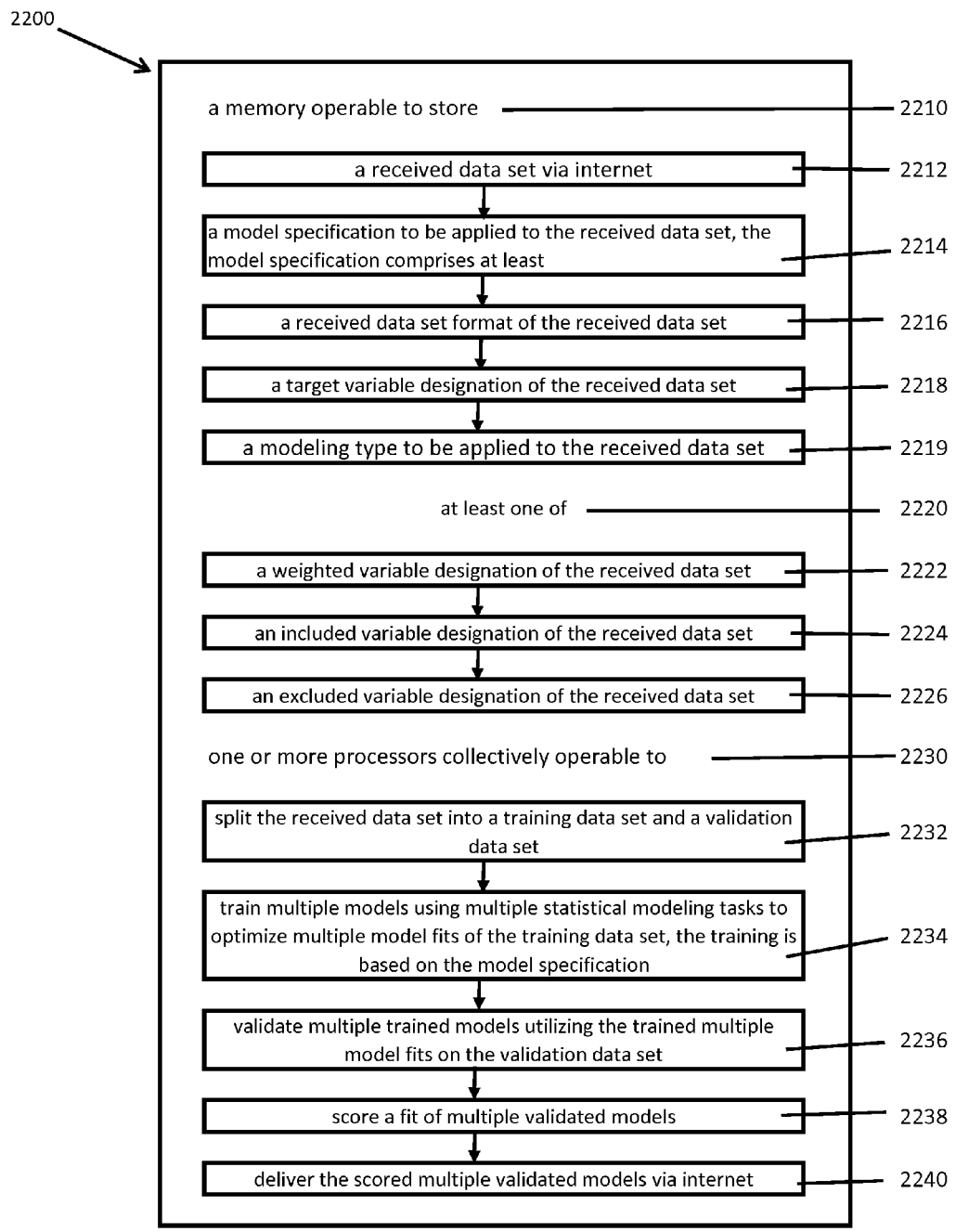
FIG. 22 depicts a third Internet based hosted system for modeling analysis.

Another example of a system 2200 to implement the modeling analysis is shown in FIG. 22. The system comprises two major systems, a memory 2210 and one or more processors 2230. The system comprises memory operable to store 2210 a data set 2212 received via Internet and a model specification 2214 to be applied to the received data set. The model specification comprises at least the following with respect to the received data set, a received data set format 2216, a target variable designation 2218, a modeling type 2219 and at least one of a weighted variable designation 2222, an included variable designation 2224 and an excluded variable designation 2226.

The system 2200 also comprises one or more processors collectively operable 2230 to split 2232 the received data set into a training data set and a validation data set, train multiple models 2234 using multiple statistical modeling tasks to optimize multiple model fits of the training data set where the training is based on the model specification. The system will additionally validate multiple trained models 2236 utilizing the trained multiple model fits on the validation data set. The system then scores a fit 2238 of the multiple validated models and delivers 2240 the scored multiple validated models via Internet.

Figure 23:
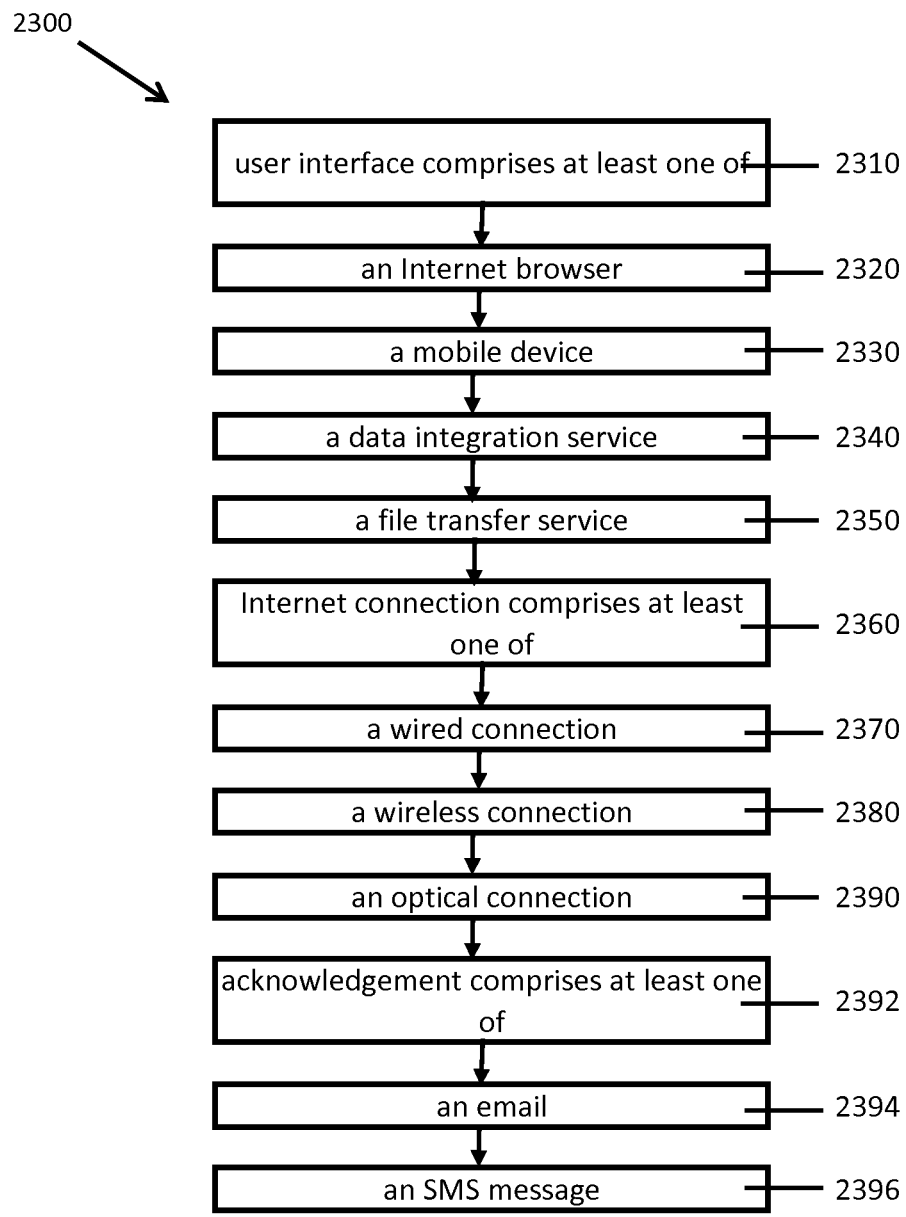
FIG. 23 depicts an Internet communication interface and connection of the system.

The Internet communication interface and network are described in FIG. 23. The Internet communication interface 2310 comprises at least one of an Internet browser 2320, a mobile device 2330, a data integration service 2340 and a file transfer service 2350. The Internet communication network 2360 comprises at least one of wired 2370, wireless 2380 and optical communication 2390. Acknowledgement of completion of the modeling process 2392 may include at least one of an email 2394 and an SMS message 2396.

What is claimed is:

1. An Internet based computer program embodied on a non-transitory computer readable medium and operable to be executed by a processor, the computer program comprising computer program comprising computer readable program code for:

receiving a plurality of statistical analysis tasks associated with at least one received data set, wherein said at least one received data set is received via Internet;

receiving a specification of said plurality of statistical analysis tasks;

collecting a specification of said statistical analysis tasks via Internet;

conducting one or more statistical analyses upon said at least one received data set based in part upon said plurality of statistical analysis tasks and said specification of said statistical analysis tasks; and delivering a result of said statistical analysis via Internet;

receiving a segmentation type of said at least one received data set, wherein said segmentation type is chosen from a group consisting of supervised segmentation and unsupervised segmentation;

collecting a target variation designation of said at least one received data set based upon said supervised segmentation;

receiving a plurality of segmentation tasks;

performing at least one of:
- a supervised segmentation analysis upon said at least one received data set based in part upon said plurality of segmentation tasks, said target variable designation and said segmentation type;
- an unsupervised segmentation analysis upon said at least one received data set based in part upon said received plurality of segmentation tasks and said segmentation type; and
- delivering a result of at least one of said supervised segmentation analysis and said unsupervised segmentation analysis via Internet.

2. An Internet based computer program embodied on a non-transitory computer readable medium and operable to be executed by a processor, the computer program comprising computer program comprising computer readable program code for:
- receiving a plurality of statistical analysis tasks associated with at least one received data set, wherein said at least one received data set is received via Internet;
- receiving a specification of said plurality of statistical analysis tasks;
- collecting a specification of said statistical analysis tasks via Internet;
- conducting one or more statistical analyses upon said at least one received data set based in part upon said plurality of statistical analysis tasks and said specification of said statistical analysis tasks; and
- delivering a result of said statistical analysis via Internet;
- collecting at least one profiling population category variable designation of said at least one received data set;
- receiving a plurality of profiling tasks;
- conducting a profiling analysis upon said at least one received data set based in part upon said received plurality of profiling tasks and said at least one profiling population category variable designation; and
- delivering a result of said profiling analysis via Internet.

3. An Internet based computer program embodied on a non-transitory computer readable medium and operable to be executed by a processor, the computer program comprising computer program comprising computer readable program code for:
- receiving a plurality of statistical analysis tasks associated with at least one received data set, wherein said at least one received data set is received via Internet;
- receiving a specification of said plurality of statistical analysis tasks;
- collecting a specification of said statistical analysis tasks via Internet;
- conducting one or more statistical analyses upon said at least one received data set based in part upon said plurality of statistical analysis tasks and said specification of said statistical analysis tasks; and
- delivering a result of said statistical analysis via Internet;
- collecting at least one analysis of variance designation of said at least one received data set;
- receiving a plurality of analysis of variance tasks;
- conducting an analysis of variance test upon said at least one received data set based in part upon said at least one analysis of variance variable designation and said plurality of analysis of variance tasks; and
- delivering a result of said analysis of variance test via Internet.

* * * * *